US010404312B2

(12) United States Patent
Yoshikawa et al.

(10) Patent No.: US 10,404,312 B2
(45) Date of Patent: Sep. 3, 2019

(54) SIGNAL PROCESSING APPARATUS (71) Applicant: SONY CORPORATION, Tokyo (JP)

(72) Inventors: Naoto Yoshikawa, Kanagawa (JP);
Shinya Tada, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/576,453

(22) PCT Filed: May 20, 2016

(86) PCT No.: PCT/JP2016/065022
§ 371 (c)(1),
(2) Date: Nov. 22, 2017

(87) PCT Pub. No.: WO2016/194652
PCT Pub. Date: Dec. 8, 2016

(65) Prior Publication Data
US 2018/0159581 A1 Jun. 7, 2018

(30) Foreign Application Priority Data

Jun. 3, 2015 (JP) ................................. 2015-113187
Dec. 18, 2015 (JP) ................................. 2015-247458

(51) Int. Cl.
*H04B 1/44* (2006.01)
(52) U.S. Cl.
CPC ..................................... *H04B 1/44* (2013.01)
(58) Field of Classification Search
CPC ... H04B 1/44; H04B 1/38; H04B 1/40; H04B 1/406; H04B 1/0003; H03D 7/1433
USPC ......................................................... 455/78
See application file for complete search history.

(56) References Cited

U.S. PATENT DOCUMENTS

| 2008/0246542 A1* | 10/2008 | Boguslavskij | ........ H03F 3/2176 330/251 |
| 2008/0279262 A1* | 11/2008 | Shanjani | .................. H04B 1/48 375/219 |
| 2011/0316062 A1* | 12/2011 | Kondo | .................... H01L 29/93 257/312 |

FOREIGN PATENT DOCUMENTS

| CN | 1463502 A | 12/2003 |
| DE | 19832565 A1 | 8/1999 |
| JP | 11-205188 A | 7/1999 |
| JP | 2004-520775 A | 7/2004 |
| JP | 2013-098771 A | 5/2013 |

OTHER PUBLICATIONS

International Search Report and Written Opinion of PCT Application No. PCT/JP2016/065022, dated Aug. 9, 2016, 06 pages of ISRWO.

* cited by examiner

*Primary Examiner* — Eugene Yun
(74) *Attorney, Agent, or Firm* — Chip Law Group (57) ABSTRACT

The present disclosure relates to a signal processing apparatus capable of reducing a circuit scale when transmitting and receiving a signal from an antenna. A first n-type MOS transistor amplifies a transmission signal to be transmitted from the antenna. A second n-type MOS transistor supplies a reception signal to be received from the antenna to a reception circuit. The first n-type MOS transistor and the second n-type MOS transistor are connected to the antenna in series. Furthermore, the reception circuit is connected to a contact between the first n-type MOS transistor and the second n-type MOS transistor. The present disclosure is capable of being applied to, for example, a radio transceiver.

12 Claims, 9 Drawing Sheets

| CIRCUIT | AT THE TIME OF TRANSMISSION | AT THE TIME OF RECEPTION |
|---|---|---|
| ADJUSTMENT CIRCUIT WITH CHANGEOVER SWITCH 33 | ADJUSTMENT OPERATION | Hi-Z |
| ADJUSTMENT CIRCUIT WITH CHANGEOVER SWITCH 51 | Hi-Z | ADJUSTMENT OPERATION |
| n-TYPE MOS TRANSISTOR 42 | AMPLIFICATION OPERATION | CONDUCTIVE STATE/ NON-CONDUCTIVE STATE |

| CIRCUIT | AT THE TIME OF TRANSMISSION | AT THE TIME OF RECEPTION |
|---|---|---|
| ADJUSTMENT CIRCUIT 101 | ADJUSTMENT OPERATION | ADJUSTMENT OPERATION |
| ADJUSTMENT CIRCUIT 131 | ADJUSTMENT OPERATION | ADJUSTMENT OPERATION |
| n-TYPE MOS TRANSISTOR 106 | AMPLIFICATION OPERATION | CONDUCTIVE STATE |
| n-TYPE MOS TRANSISTOR 107 | CONDUCTIVE STATE | NON-CONDUCTIVE STATE |

SIGNAL PROCESSING APPARATUS

CROSS REFERENCE TO RELATED APPLICATIONS

This application is a U.S. National Phase of International Patent Application No. PCT/JP2016/065022 filed on May 20, 2016, which claims priority benefit of Japanese Patent Application No. JP 2015-113187 filed in the Japan Patent Office on Jun. 3, 2015 and also claims priority benefit of Japanese Patent Application No. JP 2015-247458 filed in the Japan Patent Office on Dec. 18, 2015. Each of the above-referenced applications is hereby incorporated herein by reference in its entirety.

TECHNICAL FIELD

The present disclosure relates to a signal processing apparatus, and more particularly, to a signal processing apparatus capable of reducing a circuit scale when transmitting and receiving a signal from an antenna.

BACKGROUND ART

In the conventional radio transceiver, an antenna is shared between a transmission path and a reception path, and a radio frequency (RF) signal is transmitted/received to/from the antenna. In such a radio transceiver, a filter for a transmission signal, an adjustment circuit such as a matching circuit, a filter for a reception signal, and an adjusting circuit such as a matching circuit are connected to the antenna (for example, refer to Patent Documents 1 to 3).

Therefore, at the time of transmission, it is necessary to switch the operation of the adjustment circuit for the transmission signal from off to on and to switch the operation of the adjustment circuit for the reception signal from on to off. Similarly, at the time of reception, it is necessary to switch the operation of the adjustment circuit for the reception signal from off to on and to switch the operation of the adjustment circuit for the transmission signal from on to off.

Therefore, the adjustment circuit for the transmission signal and the adjustment circuit for the reception signal each have a changeover switch for switching ON/OFF of operation and a control wiring for supplying a control signal for controlling the changeover switch.

CITATION LIST

Patent Document

Patent Document 1: Published Japanese Translation of PCT International Application No. 2004-520775
Patent Document 2: US Patent Application Publication No. 2008/0279262
Patent Document 3: Japanese Patent Application Laid-Open No. 11-205188

SUMMARY OF THE INVENTION

Problems to be Solved by the Invention

As described above, since the conventional radio transceiver has included two changeover switches and a control wiring, the circuit scale has been large.

The present disclosure has been made in view of such a situation, and a purpose of the present disclosure is to reduce a circuit scale when transmitting and receiving a signal from an antenna.

Solutions to Problems

A signal processing apparatus according to one aspect of the present disclosure is a signal processing apparatus including a first transistor which amplifies a transmission signal to be transmitted from an antenna and a second transistor which supplies a reception signal to be received from the antenna to a reception circuit. The first transistor and the second transistor are connected to the antenna in series, and the reception circuit is connected to a contact between the first transistor and the second transistor.

According to one aspect of the present disclosure, a first transistor which amplifies a transmission signal to be transmitted from an antenna, and a second transistor which supplies a reception signal to be received from the antenna to a reception circuit. The first transistor and the second transistor are connected to the antenna in series, and the reception circuit is connected to a contact between the first transistor and the second transistor.

Effects of the Invention

According to one aspect of the present disclosure, a signal can be transmitted and received from an antenna. Furthermore, according to one aspect of the present disclosure, a circuit scale when transmitting and receiving a signal from an antenna can be reduced.

Note that the effects described herein are not necessarily limited and that the effect may be any effects described in the present disclosure.

MODE FOR CARRYING OUT THE INVENTION

The premise of the present disclosure and embodiments for carrying out the present disclosure (referred to as embodiments below) are described below. Note that, the description will be in the following order.

0. Premise of the present disclosure (FIGS. 1 and 2)
1. One Embodiment: Radio transceiver (FIGS. 3 to 9)

Premise of the Present Disclosure (Exemplary Configuration of Radio Transceiver)

Figure 1:
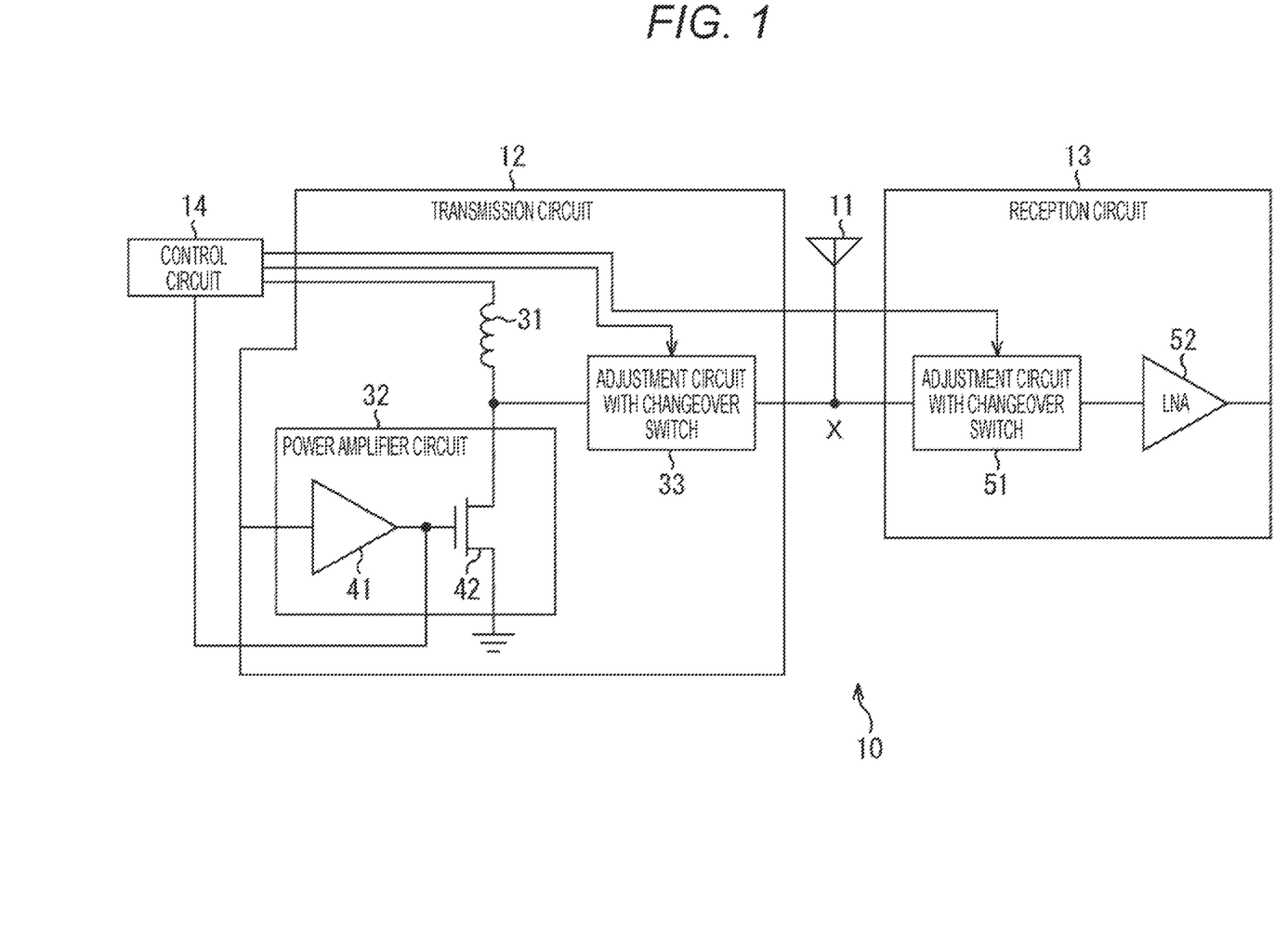
FIG. 1 is a diagram of an exemplary configuration of a radio transceiver.

FIG. 1 is a diagram of an exemplary configuration of a radio transceiver in which a transmission circuit and a reception circuit are connected in parallel to an antenna.

A radio transceiver 10 in FIG. 1 includes a transmission circuit 12 and a reception circuit 13 connected in parallel to a feeding point X of an antenna 11, and a control circuit 14 for controlling the transmission circuit 12 and the reception circuit 13. The radio transceiver 10 transmits and receives RF signals from the antenna 11.

Specifically, the transmission circuit 12 of the radio transceiver 10 includes an RF choke coil 31, a power amplifier circuit 32, and an adjustment circuit 33 with a changeover switch. The power amplifier circuit 32 includes an amplifier 41 and an n-type metal oxide semiconductor (MOS) transistor 42.

The control circuit 14 is connected to one end of the RF choke coil 31, and a predetermined potential is input from the control circuit 14. Furthermore, a drain of the n-type MOS transistor 42 and an input terminal of the adjustment circuit 33 with the changeover switch are connected to the other end of the RF choke coil 31. A source of the n-type MOS transistor 42 is connected to GND, and a gate of the n-type MOS transistor 42 is connected to an output terminal of the amplifier 41 and the control circuit 14. An output terminal of the adjustment circuit 33 with the changeover switch is connected to the feeding point X of the antenna 11. An input terminal of the amplifier 41 is connected to, for example, a transmission signal generating circuit (not shown) for generating a transmission signal which is an RF signal.

Furthermore, the reception circuit 13 includes an adjustment circuit 51 with a changeover switch and a low noise amplifier (LNA) 52. An input terminal of the adjustment circuit 51 with the changeover switch is connected to the feeding point X of the antenna 11, and an output terminal is connected to the LNA 52. An output terminal of the LNA 52 is connected to, for example, a reception signal processing circuit (not shown) for processing a reception signal which is an RF signal.

Each of the adjustment circuit 33 with the changeover switch and the adjustment circuit 51 with the changeover switch has the changeover switch and a control wiring for supplying a control signal from the control circuit 14. For example, the adjustment circuit includes a surface acoustic wave (SAW) filter, a matching circuit for adjusting impedance and the like. Each of the adjustment circuit 33 with the changeover switch and the adjustment circuit 51 with the changeover switch turns on or off an operation of the adjustment circuit (referred to as an adjustment operation below) by switching the changeover switch according to the control signal supplied by the control wiring.

The control circuit 14 inputs a predetermined potential to the RF choke coil 31. Furthermore, the control circuit 14 supplies the control signal to the adjustment circuit 33 with the changeover switch and the adjustment circuit 51 with the changeover switch. The control circuit 14 inputs a predetermined potential to the n-type MOS transistor 42.

(Operation at the Time of Transmission/Reception of Radio Transceiver)

Figure 2:
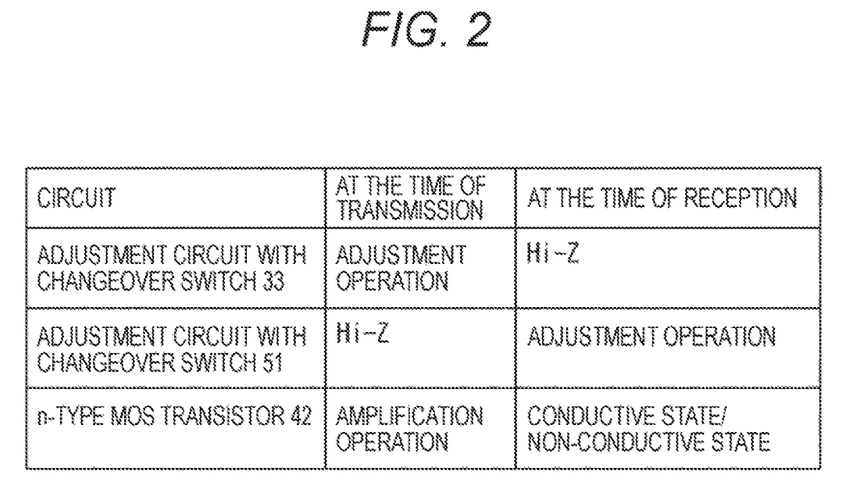
FIG. 2 is a diagram to describe an operation of the radio transceiver in FIG. 1 at the time of transmission/reception.

FIG. 2 is a diagram to describe an operation of the radio transceiver 10 in FIG. 1 at the time of transmission/reception.

As illustrated in FIG. 2, at the time of transmitting the transmission signal, in the transmission circuit 12, the control circuit 14 inputs a predetermined potential to the RF choke coil 31, and the n-type MOS transistor 42 performs an amplification operation for amplifying the transmission signal amplified by the amplifier 41 by using the input potential. The transmission signal amplified by the n-type MOS transistor 42 is input to the adjustment circuit 33 with the changeover switch.

Furthermore, the control circuit 14 supplies a control signal, for turning on the adjustment operation, to the adjustment circuit 33 with the changeover switch. With this operation, the adjustment circuit 33 with the changeover switch turns on the adjustment operation and performs the adjustment operation on the input transmission signal. The transmission signal to which the adjustment operation has been applied is transmitted via the antenna 11.

In addition, in the reception circuit 13, the control circuit 14 supplies a control signal, for turning off the adjustment operation, to the adjustment circuit 51 with the changeover switch. With this operation, the adjustment circuit 51 with the changeover switch turns off the adjustment operation and functions as a high impedance (Hi-Z). As a result, connection between the antenna 11 and the reception circuit 13 is interrupted.

On the other hand, at the time of receiving the reception signal, in the transmission circuit 12, the control circuit 14 inputs a predetermined potential to the n-type MOS transistor 42, and the n-type MOS transistor 42 is brought into a conductive state or a non-conductive state. Furthermore, the control circuit 14 supplies a control signal, for turning off the adjustment operation, to the adjustment circuit 33 with the changeover switch. With this operation, the adjustment circuit 33 with the changeover switch turns off the adjustment operation and functions as a high impedance (Hi-Z). As a result, connection between the antenna 11 and the transmission circuit 12 is interrupted.

Furthermore, in the reception circuit 13, the control circuit 14 supplies a control signal, for turning on the adjustment operation, to the adjustment circuit 51 with the changeover switch. Accordingly, the adjustment circuit 51 with the changeover switch turns on the adjustment operation and performs the adjustment operation on the reception signal received from the antenna 11. The LNA 52 amplifies the reception signal to which the adjustment operation has been applied and outputs the amplified signal.

As described above, at the time of transmission, the radio transceiver 10 turns on the adjustment operation of the adjustment circuit 33 with the changeover switch for the transmission signal and turns off the adjustment operation of the adjustment circuit 51 with the changeover switch for the reception signal. Furthermore, at the time of reception, the radio transceiver 10 turns on the adjustment operation of the adjustment circuit 51 with the changeover switch for the reception signal and turns off the adjustment operation of the adjustment circuit 33 with the changeover switch for the transmission signal. This can suppress deterioration in performance caused by sharing the antenna 11 between the transmission circuit 12 and the reception circuit 13.

However, since the adjustment circuit 33 with the changeover switch and the adjustment circuit 51 with the changeover switch each have the changeover switch and the control wiring, the circuit scale of the radio transceiver 10 is increased.

Furthermore, in general, since the power amplifier circuit 32, the LNA 52, and the control circuit 14 are configured as having the transistor as a base, the power amplifier circuit 32, the LNA 52, and the control circuit 14 can be relatively easily integrated into an integrated circuit (IC). However, since it is assumed that adjustment circuit 33 with the changeover switch and the adjustment circuit 51 with the changeover switch use capacitances and inductances with large element values, it is often difficult to integrate them into the IC.

In this case, as an external circuit of the IC, the adjustment circuit 33 with the changeover switch and the adjustment circuit 51 with the changeover switch including the changeover switch and the control wiring are mounted on a module substrate. Therefore, in comparison with a case where the adjustment circuit is mounted on the module substrate, the component cost and the area of the module substrate are increased.

As described above, according to the present technology, the changeover switch and the control wiring are reduced. With this reduction, the circuit scale of the radio transceiver can be reduced. Furthermore, in a case where the adjustment circuit is formed as an external circuit of the IC, the component cost and the area of the module substrate on which the external circuit of the IC is mounted can be reduced.

One Embodiment

Exemplary Configuration of One Embodiment of Radio Transceiver

Figure 3:
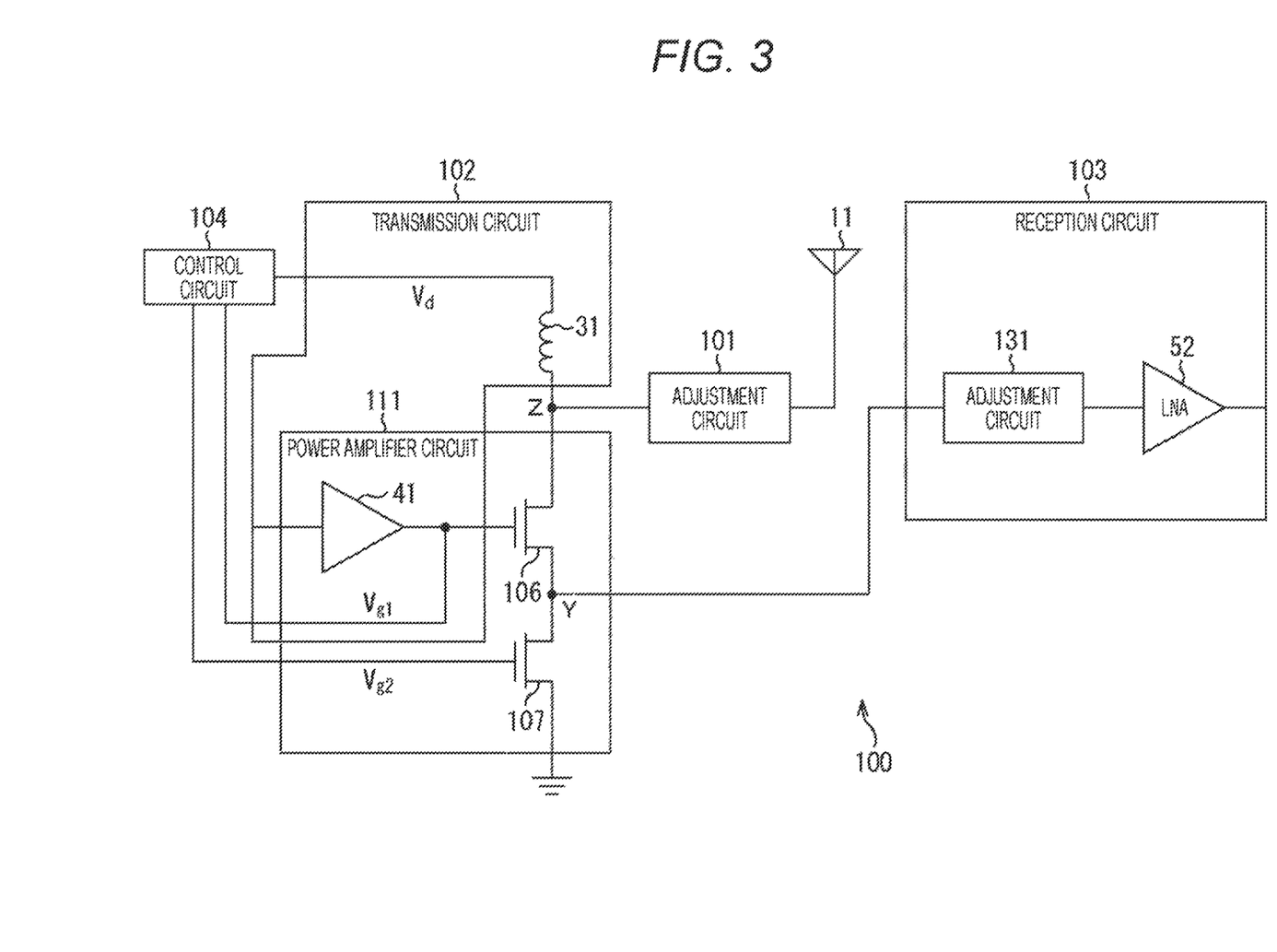
FIG. 3 is a diagram of an exemplary configuration of an embodiment of a radio transceiver as a signal processing apparatus to which the present disclosure has been applied.

FIG. 3 is a diagram of an exemplary configuration of an embodiment of a radio transceiver as a signal processing apparatus to which the present disclosure has been applied.

The components which are the same as those in FIG. 1 from among the components illustrated in FIG. 3 are denoted with the same reference numerals. The overlapped description is appropriately omitted.

A radio transceiver 100 in FIG. 3 includes an antenna 11, an adjustment circuit 101, a transmission circuit 102, a reception circuit 103, a control circuit 104, an n-type MOS transistor 106, and an n-type MOS transistor 107. In the radio transceiver 100, the antenna 11, the adjustment circuit 101, the n-type MOS transistor 106, and the n-type MOS transistor 107 are shared between the transmission circuit 102 and the reception circuit 103.

Specifically, one end of the adjustment circuit 101 of the radio transceiver 100 is connected to the antenna 11, and the other end is connected to a contact Z between the transmission circuit 102 and a power amplifier circuit 111. The adjustment circuit 101 is an adjustment circuit used for a transmission signal and a reception signal in common, and includes a SAW filter, a matching circuit for adjusting impedance, and the like. The adjustment circuit 101 performs an adjustment operation on the transmission signal and the reception signal.

The transmission circuit 102 includes an RF choke coil 31 and an amplifier 41. The amplifier 41, the n-type MOS transistor 106, and the n-type MOS transistor 107 form the power amplifier circuit 111.

The control circuit 104 is connected to one end of the RF choke coil 31, and a potential $V_d$ is input from the control circuit 104. Furthermore, the other end of the RF choke coil 31 is connected to a drain of the n-type MOS transistor 106 (first transistor) and one end of the adjustment circuit 101 at the contact Z.

A gate of the n-type MOS transistor 106 is connected to an output terminal of the amplifier 41. The amplifier 41 amplifies the transmission signal input from the input terminal and inputs the amplified signal to a gate of the n-type MOS transistor 106.

The control circuit 104 is connected to the gate of the n-type MOS transistor 106, and a potential $V_{g1}$ is input to the gate. Furthermore, a source of the n-type MOS transistor 106 is branched (connected) to a drain of the n-type MOS transistor 107 (second transistor) and the reception circuit 103 at a branch point Y in the power amplifier circuit 111. A source of the n-type MOS transistor 107 is connected to GND (grounded). The control circuit 104 is connected to a gate of the n-type MOS transistor 107, and a potential $V_{g2}$ is input to the gate.

That is, the n-type MOS transistors 106 and 107 are connected in series to the antenna 11 via the adjustment circuit 101, and the reception circuit 103 is connected to the branch point (contact point) Y between the n-type MOS transistors 106 and 107.

Furthermore, the reception circuit 103 includes an adjustment circuit 131 and a LNA 52. An input terminal of the adjustment circuit 131 is connected to the branch point Y, and an output terminal is connected to the LNA 52. The adjustment circuit 131 is an adjustment circuit used for a reception signal, and includes a SAW filter for removing interfering waves and the like, a matching circuit for adjusting impedance, and the like. The adjustment circuit 131 performs an adjustment operation on the reception signal.

The control circuit 104 inputs a potential $V_d$, a potential $V_{g1}$, and a potential $V_{g2}$ respectively to the RF choke coil 31, the n-type MOS transistor 106, and the n-type MOS transistor 107.

Note that, in a case where the adjustment circuit 101 can perform the adjustment operation suitable for both the transmission signal and the reception signal, the radio transceiver 100 does not need to have the adjustment circuit 131. In this case, it is possible to reduce the number of parts of the radio transceiver 100 and to reduce the manufacturing cost.

In addition, the RF choke coil 31, the adjustment circuit 101, the control circuit 104, the adjustment circuit 131, and the LNA 52 may be integrated in the single IC where the power amplifier circuit 111 has been mounted or may be integrated in the IC different from that of the power amplifier circuit 111.

(Operation at the Time of Transmission/Reception of Radio Transceiver)

Figure 4:
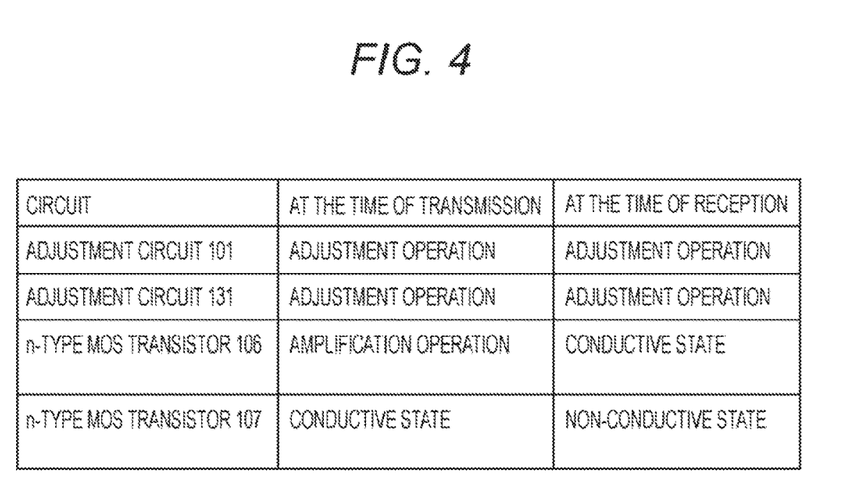
FIG. 4 is a diagram to describe an operation of the radio transceiver in FIG. 3 at the time of transmission/reception.
Figure 5:
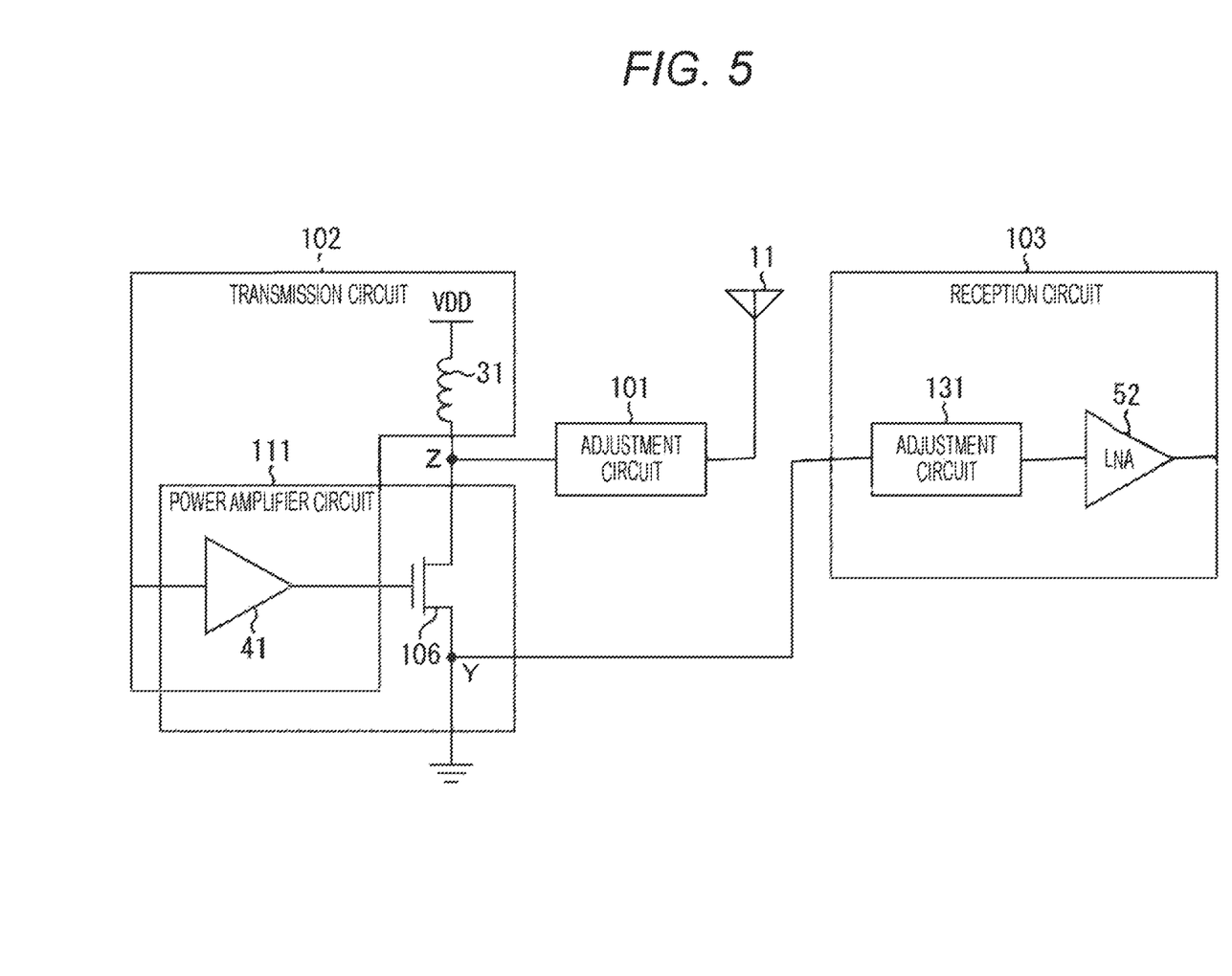
FIG. 5 is a diagram of an equalization circuit of the radio transceiver at the time of transmission.
Figure 6:
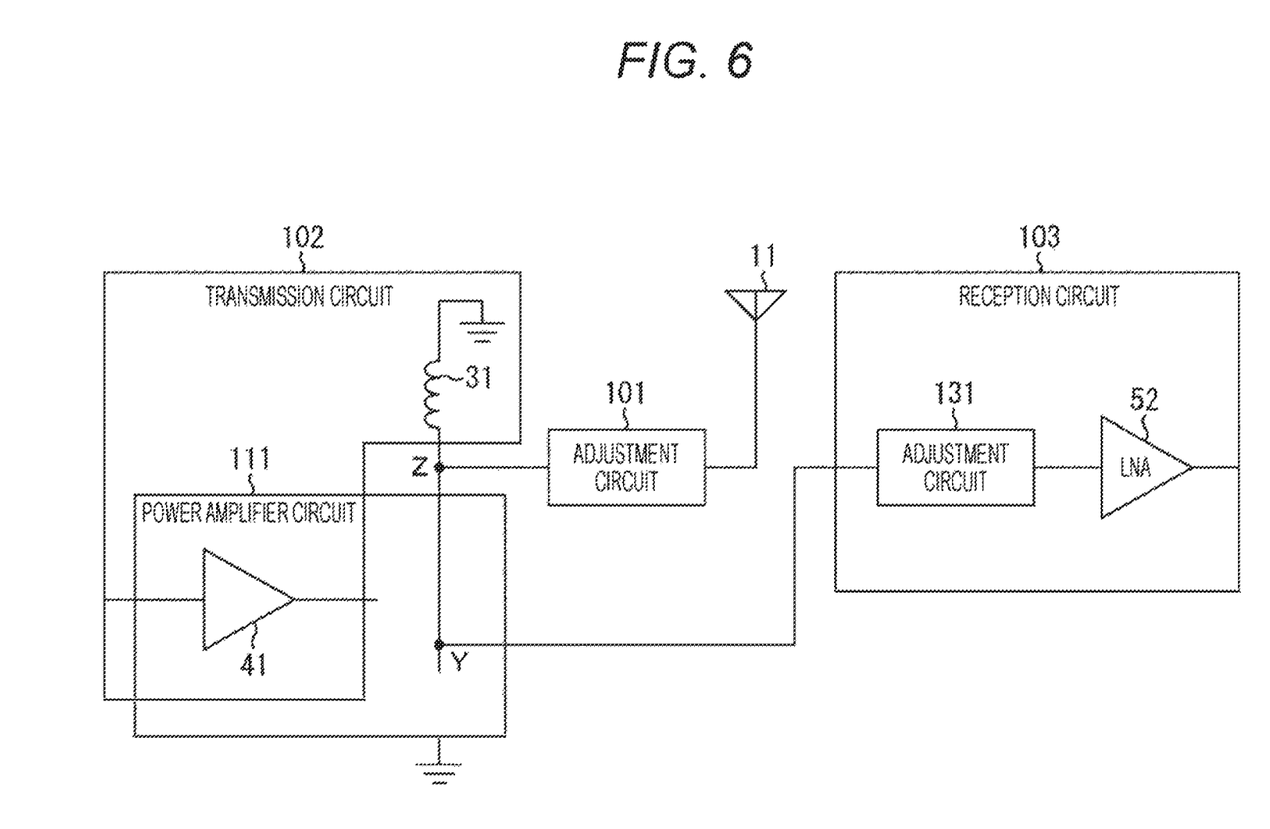
FIG. 6 is a diagram of an equalization circuit of the radio transceiver at the time of reception.

FIG. 4 is a diagram to describe an operation of the radio transceiver 100 in FIG. 3 at the time of transmission/reception. Furthermore, FIG. 5 is a diagram of an equalization circuit of the radio transceiver 100 at the time of transmission, and FIG. 6 is a diagram of an equalization circuit of the radio transceiver 100 at the time of reception.

At the time of transmitting the transmission signal, the control circuit 104 sets the potential $V_{g2}$ to be input to the gate of the n-type MOS transistor 107 to a potential VDD. With this operation, as illustrated in FIG. 4, the n-type MOS transistor 107 is brought into a conductive state. Furthermore, the control circuit 104 sets the potential $V_d$ to be input to the RF choke coil 31 to the potential VDD, and sets the potential $V_{g1}$ to be input to the gate of the n-type MOS transistor 106 to the potential $V_b$. Thus, the radio transceiver 100 is equalized with a circuit illustrated in FIG. 5.

As a result, as illustrated in FIG. 4, the n-type MOS transistor 106 performs an amplification operation for amplifying the transmission signal amplified by the amplifier 41 by using the potential VDD. The transmission signal amplified by the n-type MOS transistor 106 is input to the adjustment circuit 101.

Here, each of the adjustment circuits 101 and 131 does not have a changeover switch for switching on/off of the adjustment operation and a control wiring for supplying a control signal for controlling the changeover switch. Therefore, as illustrated in FIG. 4, the adjustment operations of the adjustment circuits 101 and 131 are constantly turned on. Therefore, the adjustment circuit 101 performs adjustment operation on the input transmission signal and transmits the adjusted signal via the antenna 11.

Furthermore, since the n-type MOS transistor 107 is brought into a conductive state so that the branch point Y is connected to the GND, the n-type MOS transistor 106 and the adjustment circuit 131 are disconnected, and no signal is supplied to the adjustment circuit 131. Therefore, although the adjustment circuit 131 is turned on, the adjustment circuit 131 does not perform the adjustment operation, and no signal is supplied to the LNA 52.

With this operation, a signal having a large amplitude from the power amplifier circuit 111 is not input to the LNA 52 at the time when the transmission signal is transmitted, generation of a distortion component in the input of the LNA 52 can be prevented.

On the other hand, at the time when the reception signal is received, the control circuit 104 sets the potential $V_{g2}$ to be input to the gate of the n-type MOS transistor 107 to the GND. With this operation, as illustrated in FIG. 4, the n-type MOS transistor 107 is brought into a non-conductive state. Furthermore, the control circuit 104 sets the potential $V_d$ to be input to the RF choke coil 31 to the GND and the potential $V_{g1}$ to be input to the n-type MOS transistor 106 to the potential VDD. According to the above, the radio transceiver 100 is equalized with a circuit illustrated in FIG. 6.

As a result, as illustrated in FIG. 4, the n-type MOS transistor 106 is brought into the conductive state and connects the branch point Y and the contact Z. With this operation, the reception signal which has been received via the antenna 11 and to which the adjustment operation has been performed by the adjustment circuit 101 is input to the adjustment circuit 131. Then, the adjustment circuit 131 performs the adjustment operation on the input reception signal, and the LNA 52 amplifies the reception signal to which the adjustment operation has been performed.

Furthermore, since the n-type MOS transistor 106 is brought into the conductive state and the potential $V_d$ is the GND, the transmission signal from the power amplifier circuit 111 is not supplied to the adjustment circuit 101. Therefore, the adjustment circuit 101 performs the adjustment operation on the reception signal.

As described above, in the radio transceiver 100, the n-type MOS transistors 106 and 107 are connected in series to the antenna, and the reception circuit 103 is connected to the branch point Y which is the contact between the n-type MOS transistors 106 and 107.

Therefore, for example, at the time when the transmission signal is transmitted, by making the n-type MOS transistor 106 perform the amplification operation and bringing the n-type MOS transistor 107 into the conductive state, the transmission signal is supplied to the adjustment circuit 101 so as to turn off the adjustment operation of the adjustment circuit 131.

Furthermore, when the reception signal is received, by bringing the n-type MOS transistor 106 into the conductive state and bringing the n-type MOS transistor 107 into the non-conductive state, the reception signal is supplied to the adjustment circuit 101 to turn on the adjustment operation of the adjustment circuit 131.

Therefore, the adjustment circuit 101 can be shared between the transmission circuit 102 and the reception circuit 103. Furthermore, the adjustment circuit 101 and the adjustment circuit 131 do not need to have the changeover switch and the control wiring for switching on/off of the adjustment operation according to the transmission/reception. As a result, the circuit scale of the radio transceiver 100 can be reduced than a case where the adjustment circuit is not shared between the transmission circuit and the reception circuit and each adjustment circuit has the changeover switch and the control wiring.

Furthermore, since the n-type MOS transistor 107 added to the radio transceiver 10 in FIG. 1 is mounted as a part of the power amplifier circuit 111, the n-type MOS transistor 107 can be relatively easily integrated into the IC. Therefore, in a case where it is difficult to integrate the adjustment circuits 101 and 131 into the IC, it is preferable that the adjustment circuits 101 and 131 be mounted on the module substrate as the external circuits of the IC. Therefore, the component cost and the area of the module substrate can be reduced than those of the radio transceiver 10.

In addition, since a serial switch is not included in the path from the power amplifier circuit 111 to the antenna 11 at the time of transmitting the transmission signal, a loss of resistance caused by the series switch can be reduced. In addition, since the branch point Y is connected (shorted) to the GND, the reception circuit 103 does not serve as a load circuit of the power amplifier circuit 111, and characteristics at the time of the transmission can be improved.

Furthermore, since the single n-type MOS transistor 106 is included as a serial switch in the path from the antenna 11 to the LNA 52 at the time when the reception signal is received, a loss of resistance caused by the n-type MOS transistor 106 is generated. However, it is possible to freely select the mounting of the adjustment circuit 131.

(Exemplary Configuration of Ramp-Up Circuit)

Figure 7:
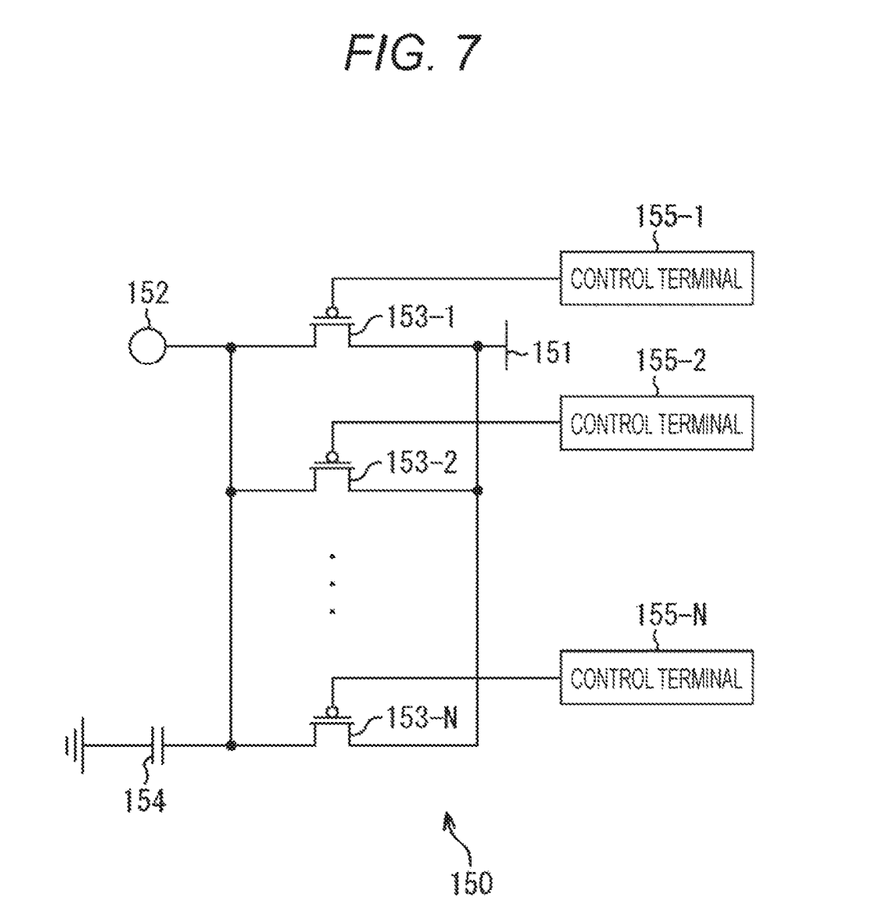
FIG. 7 is a diagram of an exemplary configuration of a ramp-up circuit.

FIG. 7 is a diagram of an exemplary configuration a ramp-up circuit which inputs the potential $V_d$ in the control circuit 104 in FIG. 3 to the RF choke coil 31.

In a ramp-up circuit 150 in FIG. 7, N (N is an integer larger than one) p-type MOS transistors 153-1 to 153-N are connected in parallel between a power supply 151 and an output terminal 152 connected to the RF choke coil 31 (FIG. 3).

Specifically, sources of the p-type MOS transistors 153-1 to 153-N are connected to the power supply 151, and drains of the p-type MOS transistors 153-1 to 153-N are connected to the output terminal 152.

A capacitor 154 is connected to the drains of the p-type MOS transistors 153-1 to 153-N. Control terminals 155-1 to 155-N are respectively connected to the gates of the p-type MOS transistors 153-1 to 153-N, and a potential is independently supplied to each gate. That is, the p-type MOS transistors 153-1 to 153-N are independently controlled.

By configuring the ramp-up circuit 150 as described above, it is possible to reduce a spread spectrum amount of the transmission signal transmitted from the radio transceiver 100.

That is, an amplitude of a voltage of the transmission signal output from the power amplifier circuit 111 (FIG. 3) which is a switching power amplifier is proportional to the potential $V_d$ of the RF choke coil 31. Therefore, in a case where a waveform of the potential $V_d$ is a rectangular wave rising from the potential zero V to a finite value, the spectrum of the transmission signal output from the power amplifier circuit 111 is obtained by a multiplication of a rectangular wave component and a carrier wave component of the transmission signal output from the amplifier 41.

When it is assumed that an order of a high-order harmonic be N, the rectangular wave is expressed as addition of high-order harmonics of a sinusoidal wave having an amplitude of 1/N with respect to a fundamental wave. Therefore, by the multiplication of the square wave component and the carrier wave component, a spread spectrum which cannot be ignored occurs. As a result, the transmission signal to be transmitted from the radio transceiver 100 may violate a spectrum mask determined by the radio law.

Therefore, in the ramp-up circuit 150, the p-type MOS transistors 153-1 to 153-N are connected in parallel between the power supply 151 and the output terminal 152, and the p-type MOS transistors 153-1 to 153-N are independently controlled. With this configuration, the potential of the output terminal 152 is prevented from instantaneously rising, and the spectrum spread can be reduced.

Whereas, in a case where the plurality of amplifiers is connected in parallel in the power amplifier circuit and the spread of the spectrum is reduced by gradually increasing or decreasing the amplitude of the transmission signal output from the amplifier, the performance of the power amplifier circuit deteriorates due to the capacitance and resistance of the wiring for connecting the power amplifiers to each other.

Furthermore, in the ramp-up circuit 150, by turning off the p-type MOS transistors 153-1 to 153-N, it is possible to set the potential $V_d$ to be close to zero V.

Furthermore, it is desirable that the size of each of the p-type MOS transistors 153-1 to 153-N be sufficiently large. In a case where the sizes of the p-type MOS transistors 153-1 to 153-N are sufficiently large, on-resistance of the p-type MOS transistors 153-1 to 153-N can be reduced. Therefore, the deterioration in the potential $V_d$ with respect to the potential VDD caused by the on-resistance of the p-type MOS transistors 153-1 to 153-N, which is generated by the direct current flowing through the p-type MOS transistors 153-1 to 153-N at the time of the transmission, can be suppressed. As a result, it is possible to suppress the deterioration in the amplitude of the transmission signal transmitted from the radio transceiver 100 and a loss due to Joule heat of the p-type MOS transistors 153-1 to 153-N.

(Exemplary Control of Gate Potential by Control Terminal)

Figure 8:
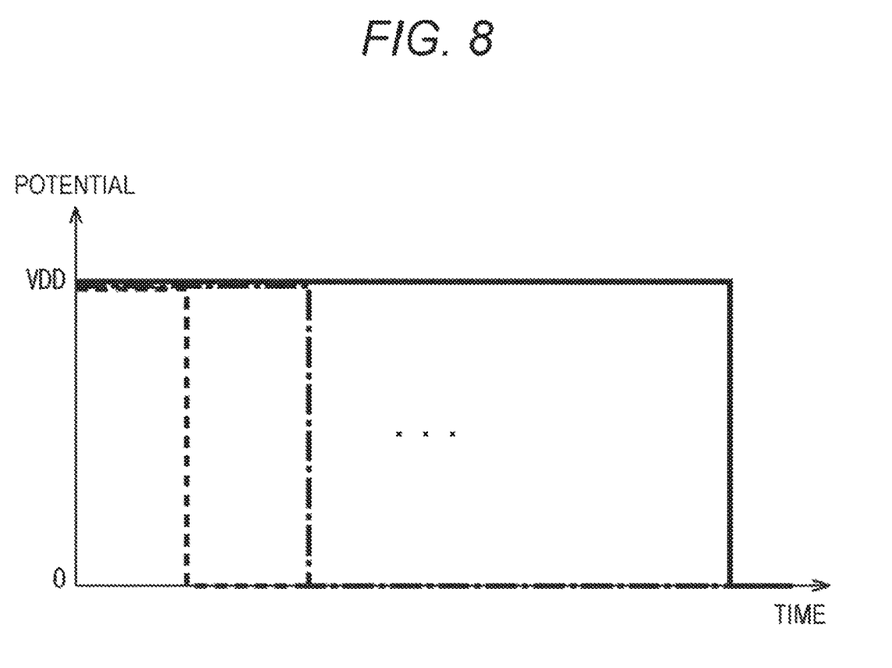
FIG. 8 is a diagram of an example of control of a potential of a gate of a p-type MOS transistor by a control terminal in FIG. 7.

FIG. 8 is a diagram of an example of control of the potentials of the gates of the p-type MOS transistors 153-1 to 153-N respectively by the control terminals 155-1 to 155-N in FIG. 7.

In FIG. 8, the horizontal axis represents time and the vertical axis represents the potentials of the control terminals 155-1 to 155-N.

A dotted line in FIG. 8 indicates a potential of the control terminal 155-1, an alternate long and short dash line indicates a potential of the control terminal 155-2, and a solid line indicates a potential of a gate of the control terminal 155-N. Furthermore, although not shown, the potentials of the gates of the control terminals 155-3 to 155-(N−1) fall sequentially between falling time points of the dotted line and the solid line.

In the example of FIG. 8, the potentials of the control terminals 155-1 to 155-N are sequentially delayed by an arbitrary time and are set to zero (GND) from the potential VDD. Therefore, the p-type MOS transistors 153-1 to 153-N are sequentially turned on. As a result, the potential of the output terminal 152 does not instantaneously rise.

(Exemplary Spectrum of Transmission Signal)

Figure 9:
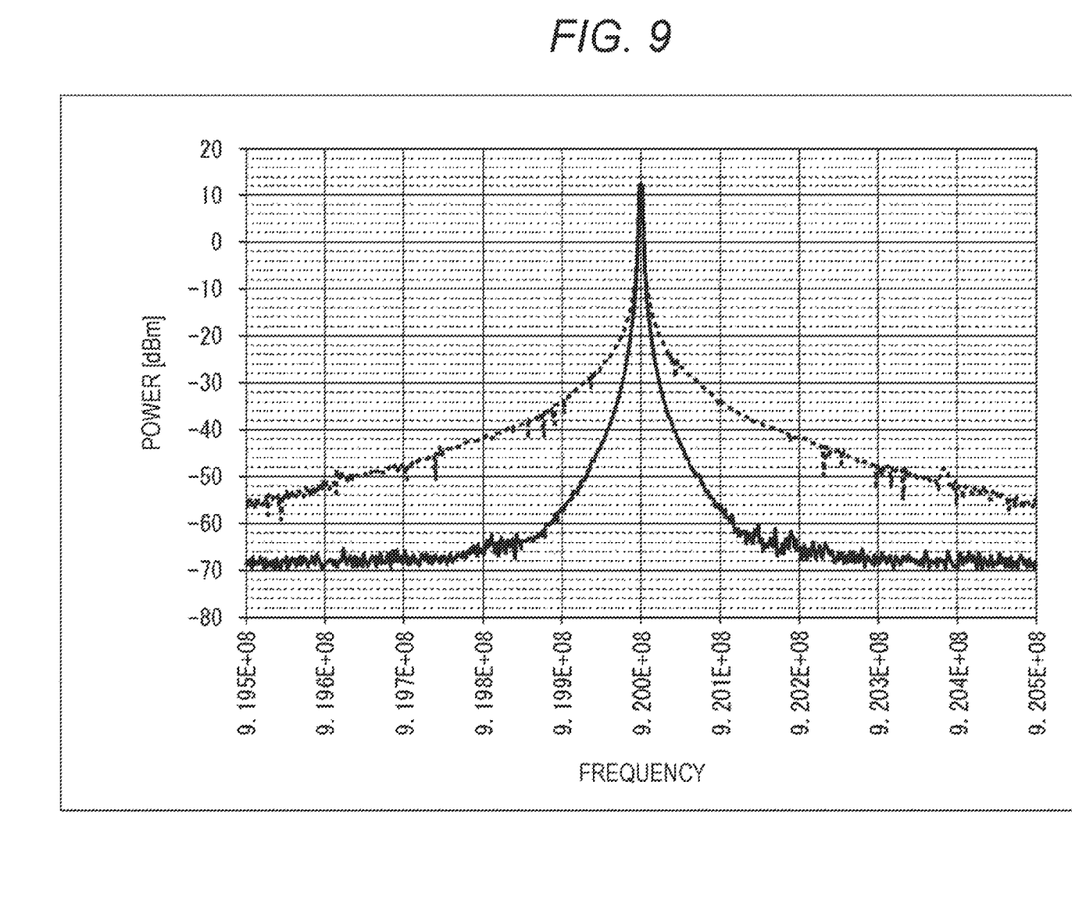
FIG. 9 is a diagram of an exemplary spectrum of a transmission signal to be transmitted from the radio transceiver.

FIG. 9 is a diagram of an exemplary spectrum of the transmission signal to be transmitted from the radio transceiver 100.

In FIG. 9, the horizontal axis represents a frequency [Hz], and the vertical axis represents power [dBm] of the transmission signal transmitted from the radio transceiver 100. Furthermore, a solid line indicates a spectrum of the transmission signal transmitted from the radio transceiver 100 including the ramp-up circuit 150, and a dotted line indicates a spectrum of the transmission signal transmitted from the radio transceiver 100 in a case where the potential $V_d$ instantaneously rises.

As indicated by the solid line in FIG. 9, the spread of the spectrum of the transmission signal transmitted from the radio transceiver 100 including the ramp-up circuit 150 is smaller than the spread of the spectrum of the transmission signal transmitted from the radio transceiver 100, which is indicated by the dotted line in FIG. 9, in a case where the potential $V_d$ instantaneously rises.

Furthermore, the effects described herein are only exemplary and not limited to these. There may be an additional effect.

In addition, the embodiment of the present disclosure is not limited to the embodiment described above and can be variously changed without departing from the scope of the present disclosure.

Furthermore, the present disclosure can have a configuration below.

(1)

A signal processing apparatus including:

a first transistor configured to amplify a transmission signal to be transmitted from an antenna; and a second transistor configured to supply a reception signal to be received from the antenna to a reception circuit, in which the first transistor and the second transistor are connected to the antenna in series, and the reception circuit is connected to a contact between the first transistor and the second transistor.

(2)

The signal processing apparatus according to (1), in which a filter for performing filter processing to the transmission signal and the reception signal is provided between the antenna and the first transistor.

(3)

The signal processing apparatus according to (1) or (2), in which a matching circuit for the transmission signal and the reception signal is provided between the antenna and the first transistor.

(4)

The signal processing apparatus according to any one of (1) to (3), in which a choke coil is connected to a contact between the antenna and the first transistor.

(5)

The signal processing apparatus according to (4), in which a plurality of transistors is connected in parallel between the choke coil and a power supply, and the plurality of transistors is independently controlled.

(6)

The signal processing apparatus according to (5), in which a source of each of the plurality of transistors is connected to the power supply, a drain of each of the plurality of transistors is connected to the choke coil, and a capacity is connected to the drain of each of the plurality of transistors.

(7)

The signal processing apparatus according to (5) or (6), in which the plurality of transistors is configured to be sequentially turned on.

(8)

The signal processing apparatus according to any one of (1) to (7), in which the filter for performing the filter processing to the reception signal in the reception circuit is connected to the contact between the first transistor and the second transistor.

(9)

The signal processing apparatus according to (8), in which the filter is a surface acoustic wave (SAW) filter.

(10)

The signal processing apparatus according to any one of (1) to (9), in which the matching circuit for the reception signal in the reception circuit is connected to the contact between the first transistor and the second transistor.

(11)

The signal processing apparatus according to any one of (1) to (10), in which a drain of the first transistor is connected to the antenna, a source of the first transistor is connected to a drain of the second transistor, and a source of the second transistor is grounded.

(12)

The signal processing apparatus according to (11), in which at the time when the transmission signal is transmitted, the first transistor performs an amplification operation, and the second transistor is brought into a conductive state, and at the time when the reception signal is received, the first transistor is brought into a conductive state, and the second transistor is brought into a non-conductive state.

REFERENCE SIGNS LIST 11 antenna
31 RF choke coil
100 radio transceiver
101 adjustment circuit
103 reception circuit
106, 107 n-type MOS transistor
131 adjustment circuit
151 Power supply
153-1 to 153-N p-type MOS transistor
154 capacity

The invention claimed is:

1. A signal processing apparatus, comprising:
a first transistor configured to amplify a transmission signal;
an antenna configured to transmit the amplified transmission signal and a reception signal;
a reception circuit;
a second transistor configured to supply the reception signal received from the antenna to the reception circuit,
wherein the first transistor and the second transistor are connected to the antenna in series, and the reception circuit is connected to a contact between the first transistor and the second transistor;
a power amplifier circuit comprising both the first transistor and the second transistor;
a first filter between the antenna and the first transistor; and
a second filter connected to the contact between the first transistor and the second transistor,
wherein the second filter is different from the first filter.

2. The signal processing apparatus according to claim 1, wherein the first filter is configured to filter the transmission signal and the reception signal.

3. The signal processing apparatus according to claim 1, further comprising a first matching circuit for the transmission signal and the reception signal, wherein the first matching circuit is between the antenna and the first transistor.

4. The signal processing apparatus according to claim 1, further comprising a choke coil connected to a contact between the antenna and the first transistor.

5. The signal processing apparatus according to claim 4, further comprising a plurality of transistors connected in parallel between the choke coil and a power supply, wherein each of the plurality of transistors is independently controlled.

6. The signal processing apparatus according to claim 5, wherein a source of each of the plurality of transistors is connected to the power supply, a drain of each of the plurality of transistors is connected to the choke coil, and a capacitor is connected to the drain of each of the plurality of transistors.

7. The signal processing apparatus according to claim 5, wherein the plurality of transistors is configured to turn on sequentially.

8. The signal processing apparatus according to claim 1, wherein the second filter is configured to filter the reception signal in the reception circuit.

9. The signal processing apparatus according to claim 8, wherein the second filter is a surface acoustic wave (SAW) filter.

10. The signal processing apparatus according to claim 1, further comprising a second matching circuit configured to receive the reception signal in the reception circuit, wherein the second matching circuit is connected to the contact between the first transistor and the second transistor.

11. The signal processing apparatus according to claim 1, wherein a drain of the first transistor is connected to the antenna, a source of the first transistor is connected to a drain of the second transistor, and a source of the second transistor is grounded.

12. The signal processing apparatus according to claim 11, wherein at a first time when the transmission signal is transmitted, the first transistor is configured to amplify the transmission signal, and the second transistor is configured to switch into a conductive state, and wherein at a second time when the reception signal is received, the first transistor is configured to switch into the conductive state, and the second transistor is configured to switch into a non-conductive state.

* * * * *